United States Patent [19]

Reh et al.

[11] 4,091,085

[45] May 23, 1978

[54] PROCESS FOR THERMAL DECOMPOSITION OF ALUMINUM CHLORIDE HYDRATES BY INDIRECT HEAT

[75] Inventors: Lothar Reh, Bergen-Enkheim; Ludolf Plass, Kronberg, both of Germany; Philippe Marchessaux, Chemin des Trois Moulins, France

[73] Assignee: Aluminum Pechiney, Lyon, France

[21] Appl. No.: 823,644

[22] Filed: Aug. 11, 1977

[30] Foreign Application Priority Data

Aug. 16, 1976 Germany .............................. 2636854

[51] Int. Cl.² ............................................... C01F 7/30
[52] U.S. Cl. ...................................... 423/625; 23/262; 23/277 R; 23/284; 34/10; 34/11; 423/DIG. 16; 423/481; 432/15
[58] Field of Search ............... 423/625, DIG. 16, 481; 34/10; 432/15

[56] References Cited

U.S. PATENT DOCUMENTS

| 2,539,263 | 1/1951 | Mumlay ...................... 423/DIG. 16 |
| 2,780,525 | 2/1957 | Wendell et al. ....................... 423/625 |
| 3,130,008 | 4/1964 | Stokes et al. ......................... 423/625 |
| 3,144,303 | 8/1964 | Engelmann .................. 423/DIG. 16 |
| 3,579,616 | 5/1971 | Reh et al. ..................... 423/DIG. 16 |
| 3,648,380 | 3/1972 | Goulloud .................... 423/DIG. 16 |
| 3,754,993 | 8/1973 | Oguchi et al. ............... 423/DIG. 16 |
| 3,836,635 | 9/1974 | Reh et al. ..................... 423/DIG. 16 |

FOREIGN PATENT DOCUMENTS

| 788,920 | 7/1968 | Canada .................................... 432/15 |
| 2,261,083 | 7/1974 | Germany ............................. 423/625 |
| 38-1353 | 2/1961 | Japan .................................. 423/625 |

OTHER PUBLICATIONS

Reh, "Chemical Engineering Progress," vol. 67, 1971, pp. 58-63.

*Primary Examiner*—Herbert T. Carter
*Attorney, Agent, or Firm*—McDougall, Hersh & Scott

[57] ABSTRACT

Thermal decomposition of aluminum chloride hydrate in a fluidized bed reactor in which the concentration of solids diminishes from the bottom upwards, the improvement wherein most of the hydrogen chloride is removed from the hydrate by direct heat and the largely decomposed aluminum chloride is fed into a calcining reactor and from the calcining reactor to a residence time reactor fluidized at low gas velocity, recycling solids from the residence reactor to the calcining reactor in an amount to adjust the suspension density and feeding the remainder to a cooler after sufficient time in the residence reactor.

20 Claims, 4 Drawing Figures

PROCESS FOR THERMAL DECOMPOSITION OF ALUMINUM CHLORIDE HYDRATES BY INDIRECT HEAT

This invention relates to a process for the thermal decomposition of aluminum chloride hydrate with calcination to aluminum oxide using a fluidized-bed reactor with a greatly loosened fluidized-bed (calcining reactor), linked with a drop of the solid concentration from bottom to top and discharge of the solid together with the gases in the upper part of the shaft, whereby prior to entry into the calcining reactor, the charged aluminum chloride hydrate is brought into contact with gases and is then fed into the calcining reactor, the solids discharged with gases in the upper part of the calcining reactor shaft are separated and at least partly returned into the calcining reactor, completely calcined aluminum oxide is fed into a fluidized-bed cooler operated with oxygen-containing gas as the fluidizing gas, at least part of the heated fluidizing gas from the fluidized-bed cooler is fed into the calcining reactor as secondary gas above the gas distributor, and the calcining reactor is heated by supplying fuel into the area between the gas distributor and the secondary gas.

For the thermal decomposition of aluminum chloride hydrate, besides processes in the "classic" fluidized bed, i.e. with a distribution state in which a dense phase is separated from the superimposed gas or dust chamber by a pronounced density jump (DOS No. 1,667,195 and DOS No. 2,261,083) a further process is known which uses a so-called highly expanded fluidized bed (DOS No. 1,767,628). In the latter case, distribution states without a clearly defined upper boundary layer are obtained by using a much higheer gas velocity than is permitted for maintaining a classic fluidized bed and in which the gas rapidly expels the solids from the reactor if new material is not constantly fed in. The solid concentration is lower than in the bed, but much higher than in the dust chamber of a conventional fluidized bed. There is no density jump between the dense phase and the superimposed dust chamber, but within the reactor, there is a continuous decrease in the solid concentration from bottom to top.

In the case of the process of DOS No. 1,767,628, there is in particular a very extensive utilization of the waste heat of the exhaust gas and discharged solids, so that a maximum fuel utilization, i.e. an optimum heat consumption coefficient can be obtained. Combustion in two stages, namely initially only with fluidization gas substoichiometrically in the high dispersion density range, then stoichiometrically or slightly superstoichiometrically in the presence of secondary gas prevents excessive heating of individual areas of the fluidized bed. The high temperature constancy and precise temperature of this are possible.

Despite these important advantages, this known process, when applied to the decomposition of aluminum chloride hydrate, has a disadvantage if for reasons connected with the reaction, e.g. due to phase transformations or for obtaining a high purity of the product, high minimum residence time of the aluminum oxide formed are necessary in the reactor system. Admittedly, a high minimum residence time can be obtained in the known process by increasing the furnace height, but this leads to a rise in the pressure loss in the fluidized-bed reactor and consequently to an increase in the power requirement.

According to an earlier proposal, which does not form part of the prior art, this disadvantage is obviated in that the solids separated from the gas are fed into a residence time reactor fluidized with a low gas velocity, a partial flow of solids is recycled in controlled manner to obtain a specific suspension density in the fluidized-bed furnace and a further partial flow is supplied to the fluidized-bed cooler after a sufficiently long residence time. Thus, the process is performed in a system which substantially comprises a fluidized-bed reactor and a residence time reactor, whereby the individual phases of the overall reaction are associated with the two reactors, corresponding to the reaction requirements. The stage of heating the particles, which consumes most of the calorific requirement in the decomposition process, is performed in the fluidized-bed reactor (main reaction). The final product quality is obtained in the residence time reactor which, compared with the main reaction, requires a comparatively longer reaction time (subsequent reaction), e.g. due to phase transformation or diffusion processes and only requires a limited heat supply.

The sole disadvantage of this known process is that, due to the above-indicated power requirement and consequently the need for fuel and oxygen-containing gases necessary for combustion purposes, a waste gas is obtained, whose hydrogen chloride concentration is comparatively low in the case of high gas volumes and consequently expensive absorption plants and large quantities of cooling agent are required for dissipating the heat from the waste gas.

Furthermore, compared with the prior art of DOS No. 1,767,628, account must be taken of high power costs due to frequent recirculation of the solids during calcination to aluminum oxide due to the long residence time necessary.

The object of the invention is to provide a process which obviates the known disadvantages and in particular those mentioned hereinbefore which leads to the formation of a high quality aluminum oxide and a waste gas with a comparatively high hydrogen chloride content.

According to the invention, this problem is solved in that by indirect heating (decomposition reactor 4) at least most of the hydrogen chloride is removed from the aluminum chloride hydrate in a fluidized-bed state, the largely decomposed aluminum chloride is fed into the calcining reactor 6, the solids separated from the gas after discharging from the shaft of calcining reactor 6 are introduced into a residence time reactor 24 fluidized with a low gas velocity, a partial flow of solids is fed back in controlled manner into the calcining reactor 6 for adjusting a particular suspension density and a further partial flow is fed into the fluidized-bed cooler 28 after an adequately long residence time.

The fluidized-bed state in which at least most of the hydrogen chloride is separated by indirect heating can correspond with that of a conventional fluidized state, preferably with an average suspension density of 500 to 1,000 kg/m$^3$ and a turbulent gas velocity below 0.8m/sec or to an expanded fluidized bed with recycling of solids (circulating fluidized bed), preferably with an average suspension density of 50 to 400kg/m$^3$ and a turbulent gas velocity of 1.5 to 5m/sec.

An advantage of using a conventional fluidized bed is the high heat transfer coefficient, caused by the high suspension density. A disadvantage is that, due to the low turbulence intensity, overheating phenomena can occur in the vicinity of the heating surfaces. When using an expended fluidized bed with recirculation of solids, overheating phenomena are reliably avoided. Furthermore, the disadvantage of the lower heat transfer coefficients are largely compensated by the possibility of a high circulation rate. The above-mentioned turbulent gas velocity relates to the effective velocity of the gas obtained in the case of indirect decomposition. It is essentially constituted of a mixture of the fluidizing gas used, the vapor formed from moisture and water of crystallization introduced, and the hydrogen chloride formed by the chemical reaction of the aluminum chloride, and evaporation of physically adhering hydrogen chloride. The gas velocity applies to the decomposition reactor free from fluidized product.

Optionally preheated foreign gases can be used for operating the fluidized bed. However, it is particularly advantageous to use waste gases from the calcining reactor. If the separation of the at least preponderent part of the hydrogen chloride takes place whilst using a conventional fluidized bed, it is recommended that the gases are introduced as secondary gases fed in above the surface of the bed, whereby the temperature thereof should be decreased beforehand. According to a further advantageous development of the invention, this is brought about through the waste gas of the calcining reactor in direct heat exchange is brought into contact with suitable quantities of fresh aluminum chloride hydrate. If the separation of the hydrogen chloride is carried out by using a circulating fluidized bed, it is unnecessary to cool the gas which can be supplied as a fluidizing gas and/or a secondary gas. If the temperature reduction is desired, this advantageously takes place in suspension exchanges having a suspending zone, e.g. a Venturi turbulator and optionally a separating zone in the form of a cyclone separator.

The indirect heating of the decomposition reactor advantageously takes place by means of heating surfaces suspended in the reactor and which are subject to the action of liquid heat carriers, such as fused salt baths or oils, Tube plates connected by guide plates (thin tubes) are particularly advantageous. When using a conventional fluidized bed, it is recommended that the tube plates be fitted in such a way that a horizontal course of the tubes is obtained, whereas when using a circulating fluidized bed, the tubes are positioned vertically in order to reduce errosion. The supply of heat carriers, fluidizing gas, optionally secondary gas and aluminum chloride hydrate and optionally the recirculation rate thereof are to be matched to one another in such a way that, in accordance with a preferred development of the invention, the fluidized bed temperature is between 200° and 400° C.

The residence time of the fluidized material is preferably made such that about 70 to 95% of the chloride is decomposed.

A flow of fluidized material is continuously removed from the decomposition reactor and fed into the calcining reactor. In the latter, the particles, which are approximately in the particle size range 20 to 300 μm (based on the average particle size of 50), are very rapidly heated due to the high temperatures therein and, due to their high specific surface, very rapidly decompose the remaining chloride, accompanid by the giving off of hydrogen chloride. This essentially takes place after leaving the calcining reactor for the first time and prior to entering the residence time reactor. The rapid heating is due to the intense heat supply caused by the fluidized state in the calcining reactor, whereby the product is at the same time protected due to the combustion being gentle through being in two states and in all it is almost stoichiometric. The phase transformations occurring during the calcining of the aluminum oxide, which require comparatively little energy but high residence times, then take place in an economic manner in a residence time reactor, thereby protecting both product and apparatus.

The amount of solids recycled from the residence time reactor is just enough for adjusting the suspension density in the calcining reactor and optionally for avoiding significant temperature differences in the complete calcining reactor/residence time reactor system.

Preferably, the operating conditions in the calcining reactor and the recycling of solid material from the residence time reactor, whilst taking account of the new material supplied, are selected in such a way that in the area between gas distributor and secondary gas line there is an average suspension density of 20 to 300 kg/m³ and in the area above the secondary gas line, an average suspension density of 1 to 20 kg/m³.

Under the above-mentioned conditions, a pressure loss of approximately 250 to 900mm water column exists in the calcining reactor.

When defining these operating conditions for the calcining reactor by means of the Froude and Archimedes numbers, the following ranges are obtained:

$$0.1 < \tfrac{3}{4} \cdot Fr^2 \cdot (\sigma_g)/(\sigma_k - \sigma_g) < 10$$

or $$0.1 < Ar < 100$$

whereby
$$Ar = d_k^3 \cdot g \, (\sigma_k - \sigma_g)/\sigma_g \cdot \nu^2$$

The symbols having the following meanings:
Fr Froude number
Ar Archimedes number
$\sigma_g$ Gas density in kg/m³
g Gravitation constant in m/sec²
$\sigma_k$ Solid particle density in kg/m³
$d_k$ Spherical particle diameter in m
γ Kinematic viscosity in m²/sec.

Compared with this, the suspension density in the residence time reactor is significantly higher, due to the low fluidizing gas velocity, which essentially solely services to bring about a thorough mixing of the solid. In order to obtain optimum use of the residence time reactor, the suspension density must exceed 600kg/m³.

In the definition based on Froude and Archimedes, the same Archimedes number range is obtained as in the calcining reactor corresponding to a Froude number of:

$$\tfrac{3}{4} \cdot Fr^2 \cdot (\sigma_g)/(\sigma_k - \sigma_g) < 5 \cdot 10^{-3}$$

The relative dimensions of the calcining reactor and the residence time reactor are essentially determined by the average total residence time necessary for producing a particular product quality. In general, it is advantageous to set the average residence time of solids in the calcining reactor to 10 to 30 minutes and in the residence time reactor to twice to 10 times this figure.

When defining the average residence time in the calcining reactor, account must also be taken of the quantity of solid recycled from the residence time reactor and it can be calculated from the sum of the average suspension density in both reactors, based on the hourly quantity of product. The choice of the fluidizing and secondary gas quantities, particularly the distribution of both gas flows and the secondary gas supply level provide additional regulating possibilities.

According to further preferred development of the invention, the secondary gas is supplied at a height corresponding to 10 to 30% of the total height of the calcining reactor. The quantity ratio of secondary gas to fluidizing gas supplied to the calcining reactor is preferably adjusted to 10:1 to 1:2.

If for adjusting the necessary suspension density in the calcining reactor, only a slight recycling of solid from the residence time reactor is required, accompanied by a comparatively long overall residence time, it is advantageous to heat the residence time reactor by direct addition of fuel. In view of the temperature in fthe system, the circulation would not then cover the complete requirements, e.g. radiation losses in the residence time reactor, but instead would only serve for fine regulation.

After an adequately long residence time, a partial flow of solids is fed into a fluidized bed cooler, which advantageously has a plurality of cooling chambers through which a flow can pass in succession. The oxygen-containing fluid gases used to maintain the operating state, are at least partly fed into the calcining reactor in the form of secondary gas. The fluidized bed cooler can be additionally equipped with cooling "registers" which pass into the chambers and in which can be heated for example fluidizing gas for the calcining reactor and optionally for the residence time reactor.

The gas quantities supplied to the reactors are advantageously selected in such a way that in the calcining reactor, there is a turbulent gas velocity of 3 to 15m/sec, preferably 4 to 10 m/sec and in the residence time reactor a turbulent gas velocity of 0.1 to 0.3m/sec, in each case based on the empty reactor.

The operating temperatures in the calcining reactor and residence time reactor are variable within wide limits and are essentially based on the sought product quality. They can be in a range of approximately 650 to 1050° C.

Air Can be Used as a fluidizing and secondary gas, which must always contain oxygen. In order to obtain a particularly high hydrogen chloride concentration in the exhaust gas, it is advantageous to use as a fluidizing gas and/or as the secondary gas, gases which are rich in oxygen and preferably have oxygen contents of up to 70% by volume.

Prior to the absorption of the hydrogen chloride contained in the waste gases, the solid carried therein are advantageously removed in an electrostatic precipitator or a Venturi scrubber.

The invention is described hereinafter relative to exemplified embodiments and with reference to the drawings.

Figure 1:
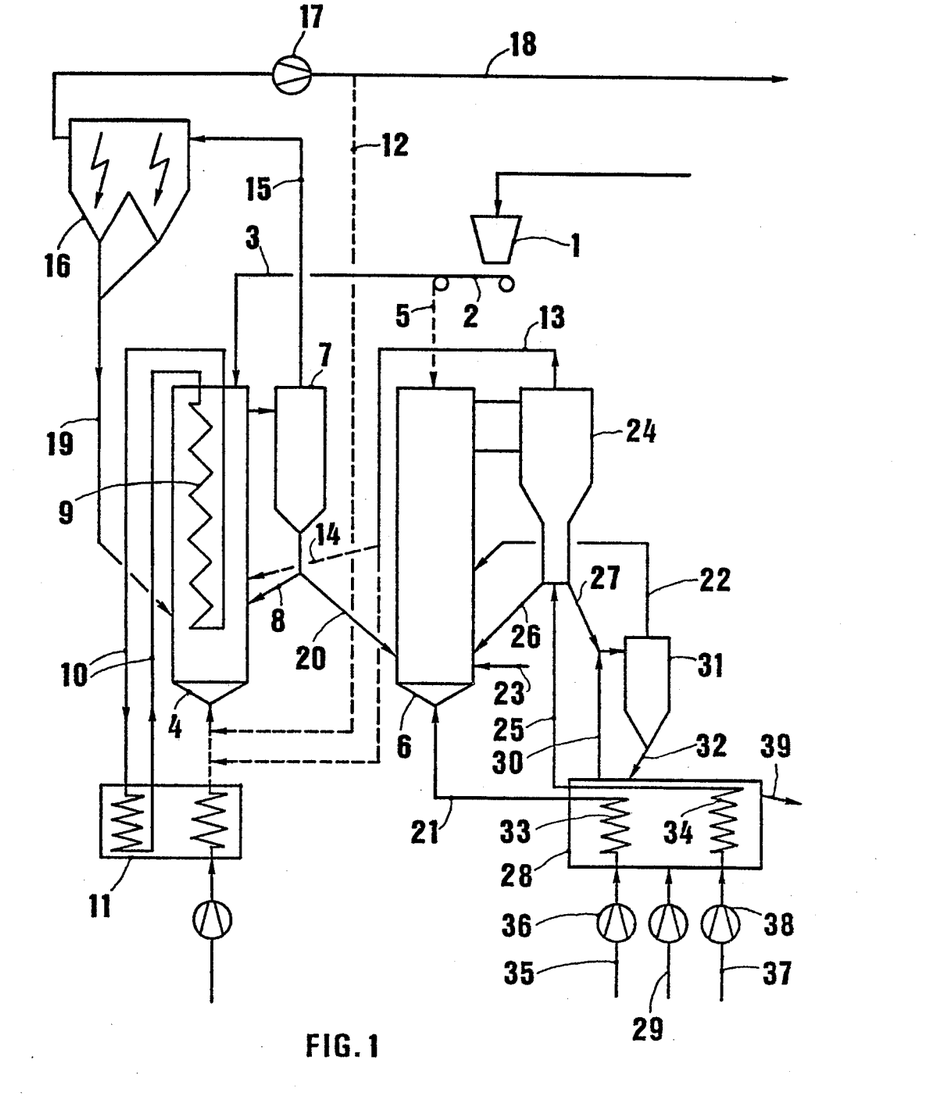
FIGS. 1 to 4 schematically illustrate four embodiments of the invention.

In FIG. 1 aluminum chloride hydrate is fed into the fluidized-bed reactor 4 via charging mechanism 1 and dosing conveyor-type weigher 2 by means of pipe 3. If desired, a partial flow can be directly fed into calcining reactor 6 via pipe 4. Fluidized bed reactor 4 is constructed as a circulating fluidized bed with separator 7 and return line 8. Its heating surfaces 9 are heated via a closed heat carrier circuit 10 with heating device 11. As desired, the fluidizing gas can be gases preheated in heating device 11, gases recycled from waste gas line 18 via pipe 12 or gases from the calcining reactor /residence time reactor 24 circulation system supplied by pipe 13. Optionally, the secondary gas can be constituted by waste gas of the above-mentioned circulation system supplied by pipe 14. The waste gas of the fluidized bed reactor 4 passes via pipe 15 into an electrostatic precipitator 16 and finally into the waste gas pipe 18, equipped with a blower 17, which leads into a not shown hydrogen chloride absorption plant. Dust separated off when electrostatic precipitator 16 is returned to fluidized bed reactor 4 via pipe 19.

A partial flow of partly decomposed aluminum chloride is supplied from circulating fluidized bed 4 to calcining reactor 6 via cyclone separator 7 and pipe 20. Calcining reactor 6 is operated by fluidizing hgas supplied via pipe 21 and secondary gas supplied via pipe 22. Fuel, particularly fuel oil or fuel gas, is supplied by means of lances 23.

The solids removed from calcining reactor 6 due to the prevailing operating condition are separated from the gas in the upper area of the residence time reactor 24 and pass into the lower zone, weakly fluidized through the supply of gas via pipe 25. The controlled recycling of solids into calcining reactor 6 takes place by means of pipe 26 and the removal of completely calcined aluminum oxide by means of discharge mechanism 27. This partial flow is fed into fluidized bed cooler 28, which is fluidized with oxygen-containing gas supplied by pipe 29. The gas which leaves the fluidized bed cooler via pipe 30 conveys the calcined aluminum oxide discharged via pipe 27 in pneumatic manner into cyclone separator 31. The oxide separated therein is fed into fluidized bed cooler 28 by means of pipeline 32. The heated gas passes via pipe 22 into calcining reactor 6 in the form of secondary gas.

In addition to the direct cooling of the aluminum oxide, indirect cooling takes place by means of cooling surfaces 33, 34. The oxygen-containing gases supplied via pipe 35 and blower 36 to cooling surface 33, where they are heated, serve as the fluidizing gas for calcining reactor 6 and the oxygen-containing gases supplied via pipe 37 and blower 38 to cooling surface 34, where they are heated, serve as the fluidizing gas for residence time reactor 24. Finally, cooled aluminum oxide is discharged via pipe 39.

Figure 2:
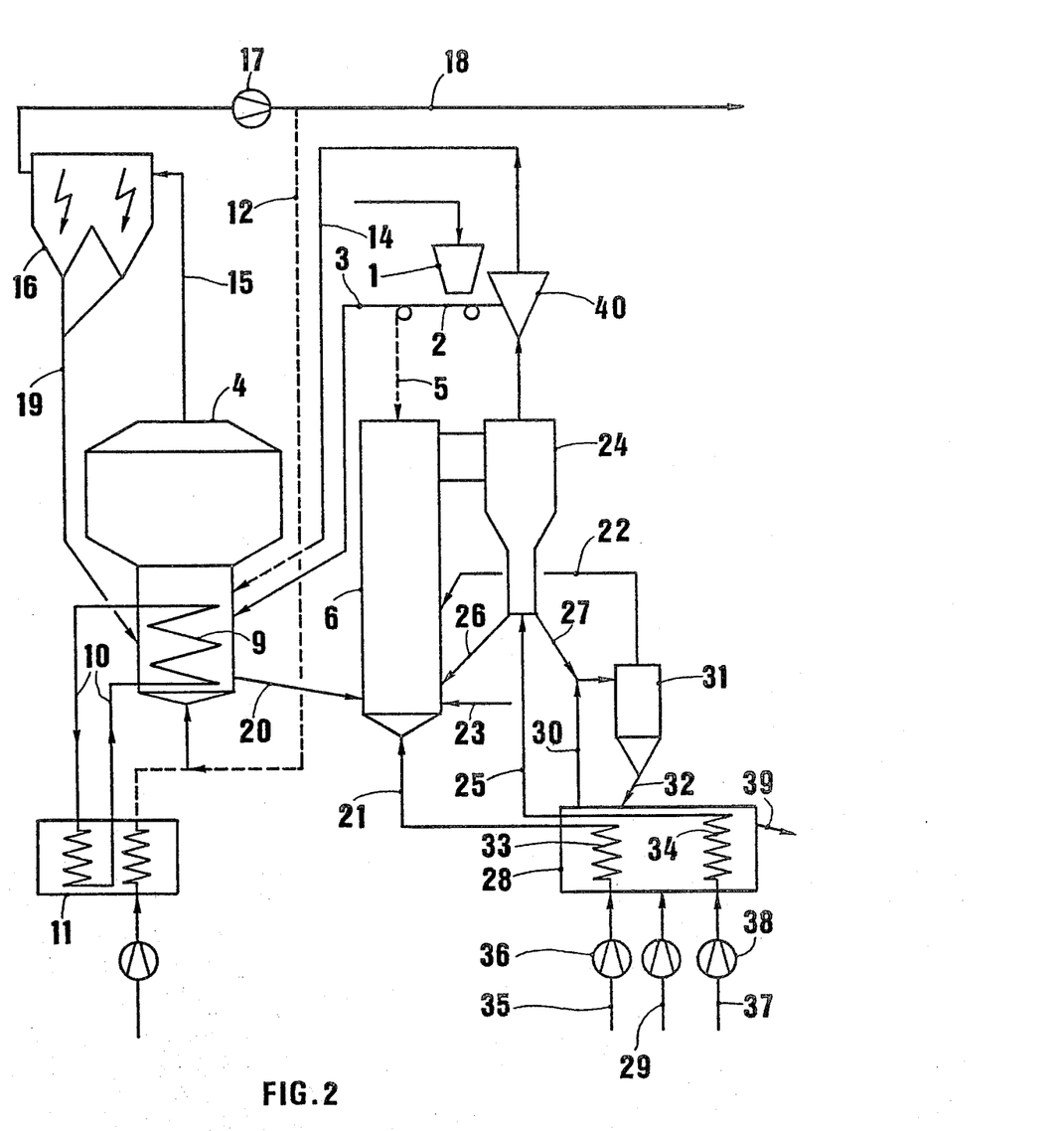

The embodiment of the invention according to FIG. 2 differs from that of FIG. 1 essentially in that a conventional fluidized bed reactor 4 is used. Thus, in this case, there is no separator for the solids discharged from the fluidized bed reactor in the case of the circulating fluidized bed and the return line in fluidized bed reactor 4 is also omitted. Following a sufficiently long residence time in fluidized bed reactor 4, the solids pass via pipe 20 into calcining reactor 6.

A further difference is that the waste gases of the circulation system comprising calcining reactor 6, residence time reactor 24 and return line 26 are brought into contact with fresh aluminum chloride hydrate in a suspension exchanger 40 prior to feeding into the fluidized bed reactor 4 and are consequently cooled to a suitable temperature. Otherwise, here again fluidized bed reactor 4 can be fluidized, as desired, by gases heated in the heating device 11 or by gases recycled from waste gas line 18 via pipe 12. The remaining solids and gas flows are identical with those of FIG. 1.

Figure 3:
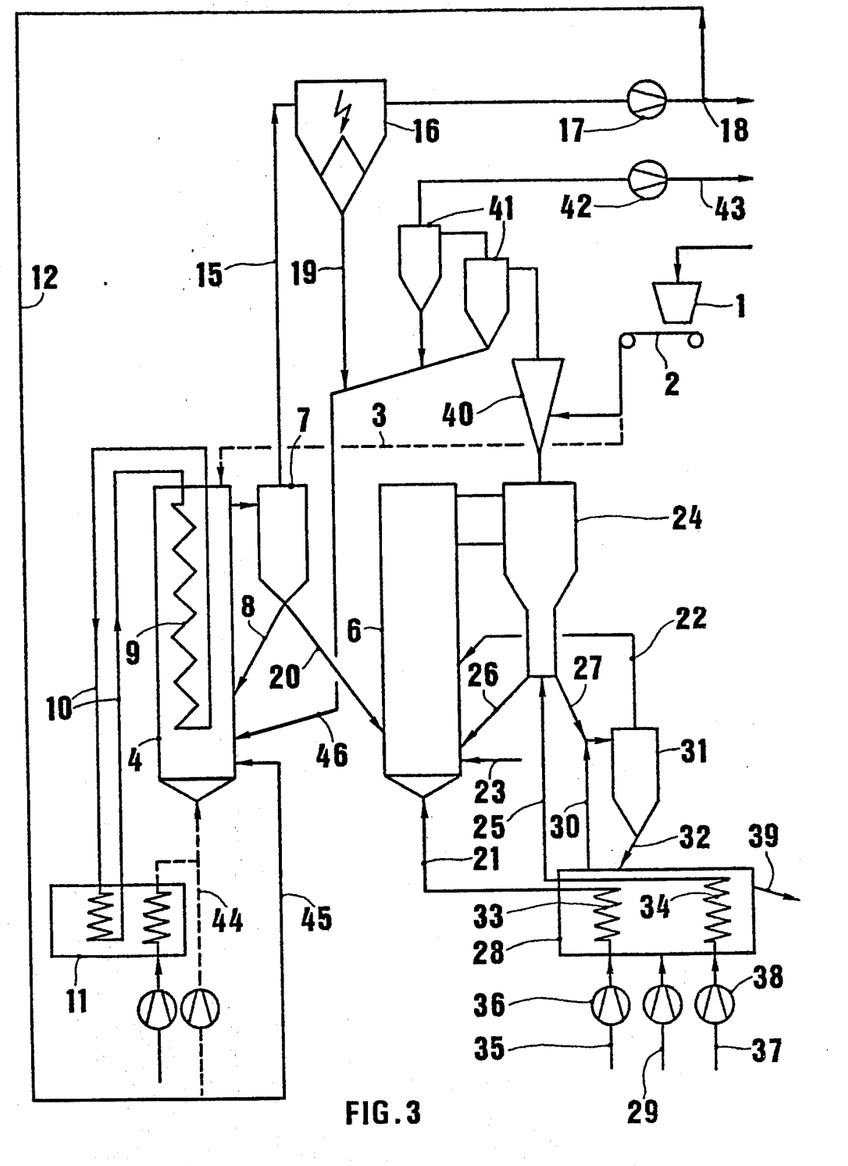
Figure 4:
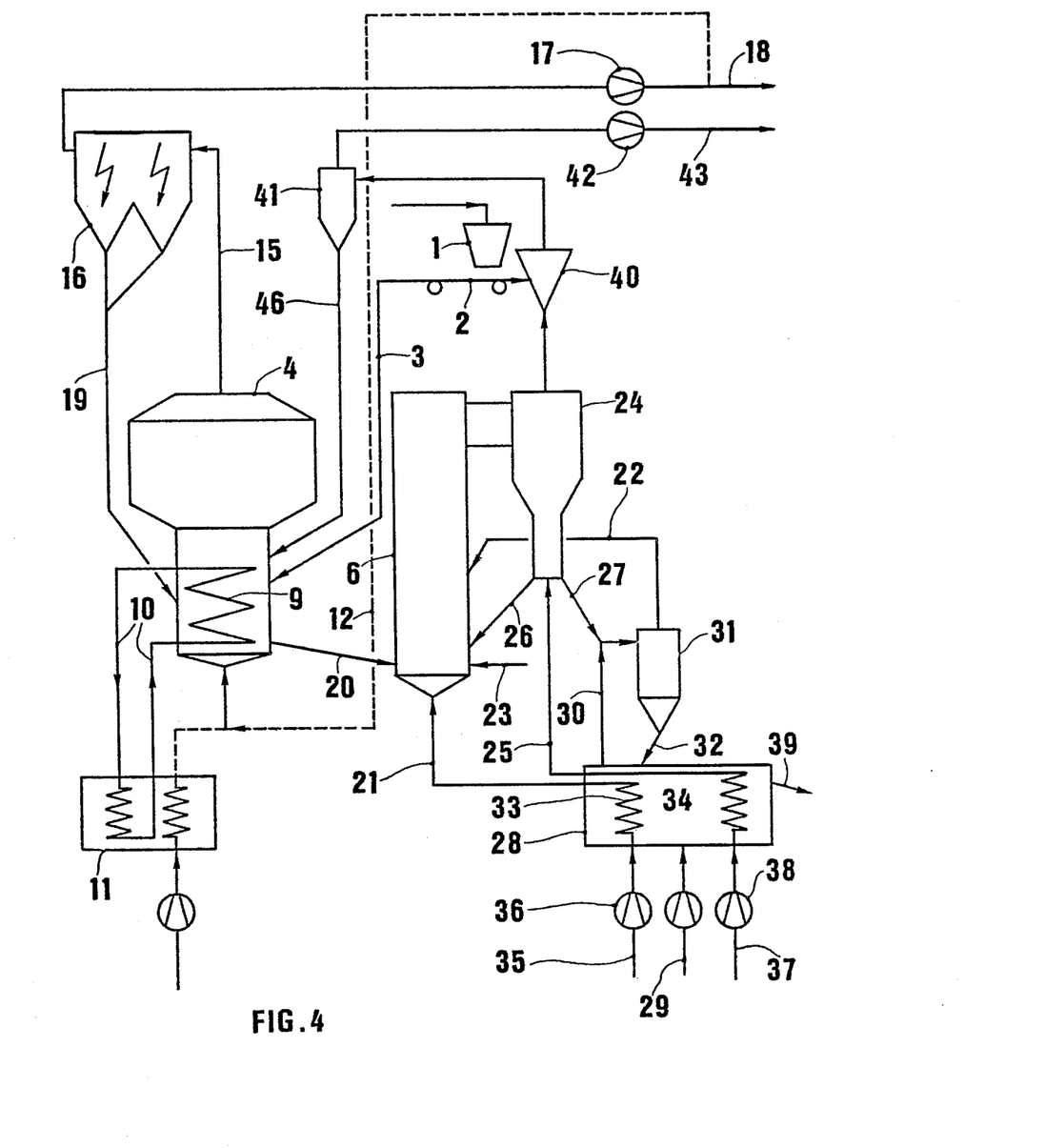

The main difference between the embodiments of FIGS. 3 and 4 and those of FIGS. 1 and 2 is that the waste gas streams from the calcining reactor 6 on the one hand and the fluidized bed reactor on the other are removed separately by means of pipes 43 or 18.

The fluidized bed reactor used according to FIG. 3 and operated as a circulating fluidized bed is operated with waste gas from pipe 18, removed via pipe 12 and fed into fluidized bed reactor 4 in the form of secondary gas by pipe 45. Optionally and with a separate blower a partial flow can be used a fluidizing gas via pipe 44. As in FIG. 2, part of the fresh aluminum chloride hydrate is supplied to a suspension exchanger 40, suspended in the waste gas of the circulation system and is separated from the gas in two series-connected cyclone separators 41. It then passes via pipe 46 into fluidized bed reactor 4. The waste gases from cyclone separators 41 are then removed by means of a blower 42 via pipe 43. The circuit shown gives the possibility of tapping a partial flow from the fresh aluminum chloride hydrate and supplying it directly to the fluidized bed reactor 4 via pipe 3. The remaining solid and gas flows coincide with those of FIGS. 1 and 2.

In FIG. 4, once again most of the aluminum chloride hydrate is decomposed by a conventionally operated fluidized bed reactor. As can be gathered from the flow diagram of FIG. 2, the solid separator and return line are superfluous. The fluidized bed reactor can once be fluidized as desired by gases preheated in heater 11 or waste gases recycled from waste gas pipe 18 via pipe 12. Fresh aluminum chloride hydrate is partly directly supplied to fluidized bed reactor 4 via pipe 3 and partly supplied to suspension exchanger 40, operated with the waste gases of the circulation system formed by calcining reactor 6, residence time reactor 24 and return line 26. After separation in separator 41, the aluminum chloride then passes by means of pipe 46 into the fluidized bed reactor 4. After separating the aluminum chloride in separator 41, the waste gas is removed by means of blower 42 via pipe 43. The operation of the calcining reactor 6, residence time reactor 24 and fluidized bed cooler 28 is identical with those of the embodiments of the flow diagrams according to FIGS. 1 to 3.

EXAMPLE 1 (With reference to FIG. 1)

By means of charging mechanism 1 and dosing conveyor-type weigher 2 every hour 100 t of $AlCl_3 \cdot 6H_2O$ with a surface moisture of approximately 15% and an average particle diameter $dp_{50}$ of 150 μm are fed into the fluidized bed reactor 4 via pipe 3. The material can be fed into the fluidized bed reactor 4 through the cover or laterally through the bottom part. Its internal diameter was 4.9m and its height 16m.

Fluidized bed reactor 4 was operated with hot waste gases at 850° C from the circulation system comprising calcining reactor 6, residence time reactor 24 and pipe 26. The waste gas quantity was about 16,000 $Nm^3/h$ and was fed as fluidizing gas into fluidized bed reactor 4 via pipe 13. Fluidized bed reactor 4 was heated with a fused mass of an alkali chloride mixture fed in through circuit 10 at 460° C and discharged at 400° C. Reheating of the fused mass took place in heating device 11 by burning 5900kg/h of heavy fuel oil ($H_u$ = 9500 kcal/kg).

In fluidized bed reactor 4 a temperature of 250° C was obtained. The turbulent gas velocity was 2.5m/sec. Due to the high gas velocity, a large proportion of the solid was discharged together with the gas in the upper part of the fluidized bed reactor. After separation in the series-connected cyclone separator 7, a controlled partial flow passed into fluidized bed reactor 4 via pipe 8 and a further partial flow into calcining reactor 6 via pipe 20. Due to the solid recycling into fluidized bed reactor 4 and the operating conditions selected therein, a suspension density of approximately 150 $kg/m^3$ and a pressure loss of 2400mm water column were obtained in the fluidized bed reactor 4. The average residence time was 2.4 hours. Due to the above conditions, approximately 90% of the aluminum chloride was decomposed.

The complete decompositon of the aluminum chloride with calcination to aluminum oxide took place in calcining reactor 6, having a vertical clearance of 15m and an internal diameter of 2.2m.

Fluidization of the calcining reactor 6 is brought about by air supplied by pipe 21 and the gas distributor in quantities of 3,144 $Nm^3/h$, preheated in fluidized bed cooler 28 to about 500° C by means of cooling register 33. 7335 $Nm^3/h$ of air were supplied via devices 30, 31 and 22 to calcining reactor 6 after direct preheating to about 500° C in fluidized bed cooler 28, being fed into the calcining reactor 6 as secondary gas 2.5m above the gas distributor. The ratio of fluidizing gas to secondary was therefore 1: 2.3. 1000kg of heavy fuel oil ($H_u$9500 kcal/kg) were injected into the area between the gas distributor and secondary air line 22 by means of lances 23. Combustion was incomplete in the area between the gas distributor and the secondary gas line 22. However, complete combustion took place above the point of feeding in the secondary gas with line 22.

The solids discharged from calcining reactor 6 were separated from the gas in the upper part of residence time reactor 24 passed into its lower part and there formed a dense fluidized bed. The cylindrical lower part of residence time reactor 24 had an internal diameter of 1.3m and a height of 3.5m.

The residence time reactor 24 was fluidized with 300$mm^3/h$ of air preheated to 500° C in cooling registers 34 of the fluidized bed cooler 28.

A uniform temperature of 850° C was obtained through-out the circulation system due to circulation of solids in calcining reactor 6 and the recycling of solids from residence time reactor 24 via pipe 26.

The total residence time of the aluminum oxide of about 0.32h was divided up in a ratio of approximately 1:2.2 over calcining reactor 6 and residence time reactor 24 (10 minutes in calcining reactor 6 and 22 minutes in residence time reactor 24). The prressure loss in calcining reactor 6 was set at about 400mm water column. The average suspension density in the area between the gas distributor and secondary gas line 22 was set at 150$kg/m^3$ and the average suspension density above the secondary gas line at 5$kg/m^3$. In residence time reactor 24 there was a suspension density of approximately 700$kg/m^3$ in the area filled by the solids.

The production of 18.3t/h of aluminum oxide was removed from residence time reactor 24 via pipe 27, cyclone separator 31 and pipe 32 and fed into fluidized bed cooler 28. A cooling of the aluminum oxide to 100° C took place in fluidized bed cooler 28, fluidized with 7335 $Nm^3/h$ of air and in cooling registers 33 and 34 with 3144 $Nm^3/h$ or 300$Nm^3/h$. The air flows preheated to 500° C by indirect heating were utilized as indicated hereinbefore.

By means of waste gas line 18, 86400 $Nm^3/h$ of gas with a hydrogen chloride concentration of 33 Vol% were removed.

EXAMPLE 2 (With reference to FIG. 2)

By means of charging mechanism 1 and dosing conveyor-type weighter 2, every hour 100 t of $AlCl_3 \cdot 6H_2O$ with a surface moisture of approximately 15% and an average particle diameter $dp_{50}$ of 150 μm were charged. By means of pipes 3, 50 t/h passed into two paralledl-connected fluidized bed reactors 4 so that each received 25 t/h. Each reactor has an internal diameter of 6.5m in the lower part and an overall height of 17m. The second partial flow of 50 t/h was fed into a Venturi turbulator 40 and formed with the 16000 Nm³/h of waste gas from the circulation system at 850° C a gas/solid suspension of 150° C fed in equal parts in the form of secondary gas to fluidized-bed reactor via pipe 14. For the fluidization of the fluidized-bed reactor 4, in each case 3200 Nm³/h of waste gas was returned from pipe 14 via pipe 12. The fluidized-bed reactors were heated with a fused mass of an alkali chloride mixture fed in via circuit 10 at 460° C and discharged at 400° C. The fused mass was reheated in heating device 11 by burning 5900 kg/h of heavy fuel oil ($H_u$ 9500 kcal/kg).

The temperature in the fluidized-bed reactors was 250° C and the turbulent gas velocity was 0.5m/sec. Due to the operating conditions selected in fluidized-bed reactors 4 an average suspension density of approximately 500 kg/m³ and a pressure loss of 4000mm water column occurred. The average residence time was 7.5 hours. Due to the above conditions, approximately 90% of the aluminum chloride was decomposed.

The waste gas flows of fluidized-bed reactors 4 were fed via a pipe to a common electrostatic precipitator 16, where the dust was removed. The waste gas in a quantity of 86400Nm³/h following a recycling of a total of 6400 Nm³/h into the fluidized-bed reactors 4 was fed at a temperature of about 220° C and a hydrogen chloride content of 31 Vol% into the not shown absorption plant.

The operating conditions and dimensions for the calcining reactor 6, residence time reactor 24 and fluidized-bed cooler 28, together with the associated units are the same as in example 1. However, the product quantity was also 18.3t/h of aluminum oxide.

EXAMPLE 3 (With reference to FIG. 3)

By means of charging mechanism 1 and dosing conveyor-type weigher 2, every hour 100t of $AlCl_3 \cdot 6H_2O$ with a surface moisture of approximately 15% and an average particle diameter $dp_{50}$ of 150 μm were charged. 50% of the quantity was fed via pipe 3 into fluidized-bed reactor 4, having an internal diameter of 4.9m and a height of 16m. The second partial flow of 50% was fed into Venturi turbulator 40 and formed with 16000 Nm³/h of waste gas from the circulation system at 850° C a gas/solid suspension of 150° C, which was fed into the series-connected cyclone separators 41. The waste gas, in a quanity of 23600 Nm³/h and having a hydrogen chloride content of 15 Vol% was fed into the not shown absorption plant at 150° C. The separated solids were passed via pipe 46 into fluidized-bed reactor 4.

Fluidized-bed reactor 4 was operated with waste gas from pipe 18, returned in a quantity of 25000 Nm³/h via pipe 12 and as fluidizing gas via pipe 44. Fluidized-bed reactor 4 was heated with a fused mass of an alkali chloride mixture, fed in via circuit 10 at 450° C and discharged at 400° C. The fused mass was reheated in heating device 11 by burning heavy fuel oil (5900 kg/h, $H_u$ 9500 kcal/kg).

A temperature of 250° C was obtained in fluidized-bed reactor 4. The turbulent gas velocity was 2.5m/sec. Due to the high gas velocity a high proportion of the solids were discharged with the gas in the upper part of the fluidized-bed reactor, separated in the series-connected cyclone separator 7, partly recycled into fluidized-bed reactor 4 via pipe 8 and partly fed into calcining reactor 6 via pipe 20. Due to the recycling of solids into fluidized-bed reactor 4 and the operating conditions selected therein, an average suspension density of approximately 150 kg/m³ and a pressure loss of 2400mm water column were obtained in fluidized-bed reactor 4. The average residence time was 2.4 hours. Due to the above conditions about 90% of the aluminum chloride was decomposed.

After feeding in via pipe 15, the dust was removed from the waste gas flow of fluidized-bed reactor 4 in electro-static precipitator 16 and, after recycling a partial flow, was supplied in a quantity of 62800 Nm³/h and with a hydrogen chloride content of 37 Vol% via pipe 18 to the not shown absorption plant.

The operating conditions and dimensions of calcining reactor 6, residence time reactor 24, fluidized-bed cooler 28 and the associated units are as in example 1. The product quantity was also 18.3 t/h of aluminum oxide.

We claim:

1. A continuous process for the thermal decomposition of aluminum chloride hydrate into solid aluminum oxide and gaseous hydrogen chloride comprising
   (1) introducing the aluminum chloride hydrate into a decomposition reaction zone,
   (2) introducing a fluidizing gas into the decomposition reaction zone to maintain the aluminum chloride hydrate in a fluidized state within said reaction zone,
   (3) indirectly heating the aluminum chloride hydrate, while in the fluidized state in said reaction zone until a preponderant portion of the thermal decomposition of the aluminum chloride hydrate has taken place in said reaction zone,
   (4) separating the effluent from the reaction zone into a gaseous phase containing hydrogen chloride and a solid phase of partially decomposed aluminum chloride hydrate,
   (5) passing the separated solid phase of partially decomposed aluminum chloride hydrate to a directly heated calcining zone,
   (6) calcining the partially decomposed aluminum chloride hydrate in the calcining zone to advance the thermal decomposition of the partially decomposed aluminum chloride hydrate,
   (7) passing the calcined aluminum chloride hydrate from the calcining zone into a residence reaction zone,
   (8) introducing gases into the residence reaction zone in an amount to maintain the solid material in a fluidized state,
   (9) recycling a portion of the solid material from the residence reaction zone to the calcining zone, and
   (10) cooling a portion of the solid material from the residence reaction zone as product.

2. A process as claimed in claim 1, in which decomposition of the aluminum chloride hydrate is carried out in an indirectly heated conventional fluidized bed in which the average suspension density is in the range of 500 to 1000 kg/m³ and the turbulent gas velocity is maintained below 0.8 m/sec.

3. A process as claimed in claim 1, in which the aluminum chloride hydrate is decomposed in an indirectly heated circulating fluidized bed in which the average suspension density is maintained at a value in the range of 50 to 400 kg/m$^3$, whilst the turbulent gas velocity is maintained at a value in the range of 1.5 to 5 m/sec.

4. A process as claimed in claim 1, in which waste gases from the calcining reactor are used for operating the indirectly heated fluidized bed.

5. A process as claimed in claim 4, in which the temperature of the waste gases of the calcining reactor are lowered by direct contact with fresh aluminum chloride hydrate.

6. A process as claimed in claim 1, in which at last the preponderant part of the $AlCl_3 6H_2O$ is decomposed at a temperature in the range of 200° to 400° C.

7. A process as claimed in claim 1, in which 75 to 95% of the aluminum chloride is decomposed in the decomposition reactor.

8. A process as claimed in claim 1, in which the average suspension density in the residence time reaction zone above 600 kg/m$^3$.

9. A process as claimed in claim 1, in which the average residence time of the solids in the calcining zone is within the range of 10 to 30 minutes.

10. A process as claimed in claim 1, in which the average residence time of the solids in the residence reaction zone is twice to ten times the average residence time in the calcining reactor.

11. A process as claimed in claim 1 which includes the step of cycling the hot gases from the calcination zone to the thermal reaction zone.

12. A process as claimed in claim 1 which includes the step of passing the hot gases from the calcination zone into heat exchange relation with aluminum chloride hydrate to cool the gases and to preheat the hydrate before introduction into the thermal reaction zone.

13. A process as claimed in claim 1 which includes the steps of introducing a fluidized gas through a distributor in the lower portion of the calcining zone and introducing a secondary gas into the calcining zone at a level above the distributor.

14. A process as claimed in claim 13, in which the secondary gas is introduced into the calcining zone at a height corresponding to 10 to 30% of the height of the calcining zone.

15. A process as claimed in claim 13, in which the quantity ratio of secondary gas to fluidizing gas supplied to the calcining zone is withhin the range of 10:1 to 1:2.

16. A process as claimed in claim 13, in which the fluidizing gas and/or secondary gas is an oxygen rich gas.

17. A process as claimed in claim 16 in which the gases have an oxygen content of up to 70% by volume.

18. A process as claimed in claim 13 which includes the step of separating the effluent from the residence reaction zone into a gas phase and a solid substantially decomposed aluminum chloride hydrate and cycling the separated gas phase as secondary gas introduced into the calcining zone.

19. The process as claimed in claim 13, in which the average suspension density in the calcining zone is maintained within the range of 20–300 kg/m$^3$ in the area between the distributor and the inlet for the secondary gas and within the range of 1–20 kg/m$^3$ in the area above the inlet for the secondary gas.

20. The process as claimed in claim 1 which includes the step of passing combustion gas used for directly heating the calcination zone in heat exchange relation with the solid aluminum oxide from the calcination zone to cool the latter while preheating the combustion gas.

* * * * *

UNITED STATES PATENT OFFICE
CERTIFICATE OF CORRECTION

Patent No. 4,091,085  Dated May 23, 1978

Inventor(s) Lothar Reh, Ludolf Plass and Philippe Marchessaux

It is certified that error appears in the above-identified patent and that said Letters Patent are hereby corrected as shown below:

Col. 5, line 16, correct the spelling of the word "the";

Col. 5, line 68, insert the numeral "6" after "reactor";

Col. 6, line 14, correct the spelling of the word "gas";

Col. 9, line 3, correct the spelling of the word "parallel";

Claim 6, line 1, change "last" to "least".

Signed and Sealed this

Fifth Day of December 1978

[SEAL]

Attest:

RUTH C. MASON
Attesting Officer

DONALD W. BANNER
Commissioner of Patents and Trademarks